(12) United States Patent
Pangal et al.

(10) Patent No.: US 6,889,241 B2
(45) Date of Patent: May 3, 2005

(54) FLOATING POINT ADDER

(75) Inventors: Amaresh Pangal, Hillsboro, OR (US); Dinesh Somasekhar, Hillsboro, OR (US); Sriram R. Vangal, Hillsboro, OR (US); Yatin V. Hoskote, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 591 days.

(21) Appl. No.: 09/873,721

(22) Filed: Jun. 4, 2001

(65) Prior Publication Data

US 2002/0184285 A1 Dec. 5, 2002

(51) Int. Cl.[7] .................................................. G06F 7/50
(52) U.S. Cl. ........................................................ 708/505
(58) Field of Search ........................................ 708/505

(56) References Cited

U.S. PATENT DOCUMENTS

| | | | |
|---|---|---|---|
| 5,764,089 A | 6/1998 | Partovi et al. | 327/200 |
| 5,898,330 A | 4/1999 | Klass | 327/210 |
| 5,900,759 A | 5/1999 | Tam | 327/201 |
| 6,018,756 A | * 1/2000 | Wolrich et al. | 708/505 |
| 6,175,851 B1 | * 1/2001 | Iourcha et al. | 708/505 |
| 6,397,239 B2 | * 5/2002 | Oberman et al. | 708/505 |
| 6,529,928 B1 | * 3/2003 | Resnick et al. | 708/505 |
| 6,571,267 B1 | * 5/2003 | Yoshioka | 708/505 |
| 6,578,060 B2 | * 6/2003 | Chen et al. | 708/505 |

OTHER PUBLICATIONS

Elguibaly, F., "A Fast Parallel Multiplier–Accumulator Using the Modified Booth Algorithm", *IEEE Transactions on Circuits and Systems—II : Analog and Digital Signal Processing*, 47 (9), pp. 902–908, (Sep. 2000).

Hokenek, E., et al., "Second–Generation RISC Floating Point with Multiply—Add Fused", *IEEE Journal of Solid–State Circuits*, 25 (5), pp. 1207–1213, (1990).

Luo, Z., et al., "Accelerating Pipelined Integar and Floating–Point Accumulations in Configurable Hardware with Delayed Addition Techniques", *IEEE Transactions on Computers*, 49 (3), 208–218, (Mar. 2000).

Panneerselvam, G., et al., "Multiply–Add Fused RISC Architectures for DSP Applications", *IEEE Pac Rim*, pp. 108–111, (1993).

Beaumont–Smith, A., et al., "Reduced Latency IEEE Floating–Point Standard Adder Architectures", *Proceedings of the 14th IEEE Symposium on Computer Arithmetic*, 8 pgs., (1998).

Even, G., et al., "On the Design of IEEE Compliant Floating Point Units", *IEEE Transactions on Computers*, vol. 49, 398–413, (May 2000).

Goto, G., et al., "A 54 × 54–b Regularly Structured Tree Multiplier", *IEEE Journal of Solid–State Circuits*, vol. 27, 1229–1236, (Sep. 1992).

(Continued)

*Primary Examiner*—David H. Malzahn
(74) *Attorney, Agent, or Firm*—Schwegman, Lundberg, Woessner & Kluth, P.A.

(57) ABSTRACT

A floating point adder circuit includes an exponent path and a mantissa path. The exponent path includes a comparator to compare two three-bit exponents. The two exponents are each incremented, and a resultant exponent is chosen from one of the two original exponents or one of the incremented exponents. The mantissa path includes an adder to add mantissas, and an adder bypass path to select one of the mantissas in lieu of performing an addition. The mantissa path also includes constant shifters that conditionally shift the mantissas right by thirty-two bit positions.

40 Claims, 6 Drawing Sheets

OTHER PUBLICATIONS

Ide, N., et al., "2.44–GFLOPS 300–MHz Floating–Point Vector–Processing Unit for High–Performance 3–D Graphics Computing", *IEEE Journal of Solid–State Circuits*, vol. 35, 1025–1033, (Jul. 2000).

Klass, F., "Semi–Dynamic and Dynamic Flip–Flops with Embedded Logic", *Proceedings of the Symposium on VLSI Circuits, Digest of Technical Papers*, Honolulu, HI, IEEE Circuits Soc. Appl. Phys. Inst. Electron., Inf. & Commun. Eng. Japan, pp. 108–109, (1998).

Lee, K.T., et al., "1 GHz Leading Zero Anticipator Using Independent Sign–Bit Determination Logic", *200 Symposium on VLSI Circuits Digest of Technical Papers*, 194–195, (2000).

Partovi, H., et al., "Flow–Through Latch and Edge–Triggered Flip–Flop Hybrid Elements", *Proceedings of the IEEE International Solid–State Circuits Conference, Digest of Technical Papers and Slide Supplement*, NexGen Inc., Milpitas, CA, 40 pgs., (1996).

* cited by examiner

FLOATING POINT ADDER

FIELD

The present invention relates generally to floating point operations, and more specifically to floating point adders.

BACKGROUND

Fast floating point mathematical operations have become an important feature in modem electronics. Floating point units are useful in applications such as three-dimensional graphics computations and digital signal processing (DSP). Examples of three-dimensional graphics computation include geometry transformations and perspective transformations. These transformations are performed when the motion of objects is determined by calculating physical equations in response to interactive events instead of replaying prerecorded data.

Many DSP operations, such as finite impulse response (FIR) filters, frequently compute $\Sigma(a_i b_i)$, where i=0 to n−1, and $a_i$ and $b_i$ are both single precision floating point numbers. This type of computation benefits from floating point adders that operate at high frequencies and at low power. Design of fast, low power, floating point adders can be difficult, in part because they typically include circuits for alignment, mantissa addition, normalization, rounding, and other complex operations.

The Institute of Electrical and Electronic Engineers (IEEE) has published an industry standard for floating point operations in the ANSI/IEEE Std 754-1985, *IEEE Standard for Binary Floating-Point Arithmetic*, IEEE, New York, 1985, hereinafter referred to as the "IEEE standard." Floating-point numbers are represented as a concatenation of a sign bit, an exponent field, and a significant field (also referred to as the mantissa). In the IEEE single precision floating-point format, the most significant bit (integer bit) of the mantissa is not represented. The most significant bit of the mantissa has an assumed value of 1, except for denormal numbers, whose most significant bit of the mantissa is 0. A single precision floating point number as specified by the IEEE standard has a 23 bit mantissa field, an eight bit exponent field, and a one bit sign field.

For all examples in this description, floating point adders compute the sum C, of two floating point operands, A and B. The floating point numbers A, B, and C have mantissas $M_a$, $M_b$, and $M_c$, exponents $E_a$, $E_b$, and $E_c$, and signs $S_a$, $S_b$, and $S_c$, respectively.

A typical implementation for a floating point adder compliant with the IEEE standard is shown in FIG. 1. Small arithmetic logic unit (ALU) 110 of adder 100 compares the exponents $E_a$ and $E_b$ of floating point numbers A and B to determine which is smaller and by how much, and provides the exponent difference 112 to control unit 114. In response to the exponent difference, control unit 114 selects the larger exponent using multiplexor 122, selects the mantissa of the smaller number using multiplexor 116, and selects the mantissa of the larger number using multiplexor 118. Control unit 114 also controls shifter 120 to cause the mantissa of the smaller number to be shifted right so that it aligns with the mantissa of the larger number. The aligned mantissas are then summed using ALU 124. Normalization is performed using blocks 126 and 128, and rounding is performed by rounding hardware 130.

FIG. 2 shows a flowchart of a method carried out by the hardware in FIG. 1. First, in block 210, the exponents of the two numbers are compared and the mantissa of the smaller number is shifted to the right until its exponent would match the exponent of the larger number. This corresponds to the operation of ALU 110, control unit 114, and shifter 120. In block 220, the mantissas are summed. This corresponds to the operation of ALU 124. Blocks 230 and 250 perform normalizing and rounding, and block 260 forms a loop to allow renormalization if rounding has caused the number to become denormalized. The floating point adder and method of FIGS. 1 and 2 are discussed further in David A. Patterson & John L. Hennessy, "Computer Organization and Design: The Hardware/Software Interface," 275–300 (Morgan Kaufmann Publishers, 2d ed. 1998).

The comparison performed by small ALU 110 (FIG. 1) can be expensive in terms of execution time, in part because at least one subtraction is performed to determine the difference between the exponent values. In addition, the shift performed by right shifter 120 can be expensive in terms of time because a variable shift of zero to twenty-three bits is performed after the exponent difference is calculated. Although these problems have been illustrated in a single precision floating point operation compliant with the IEEE standard, one skilled in the art will appreciate that similar problems exist with extended precision floating point operations and with operations not compliant with the IEEE standard.

For the reasons stated above, and for other reasons stated below which will become apparent to those skilled in the art upon reading and understanding the present specification, there is a need in the art for efficient floating point addition operations.

DESCRIPTION OF EMBODIMENTS

Figure 1:
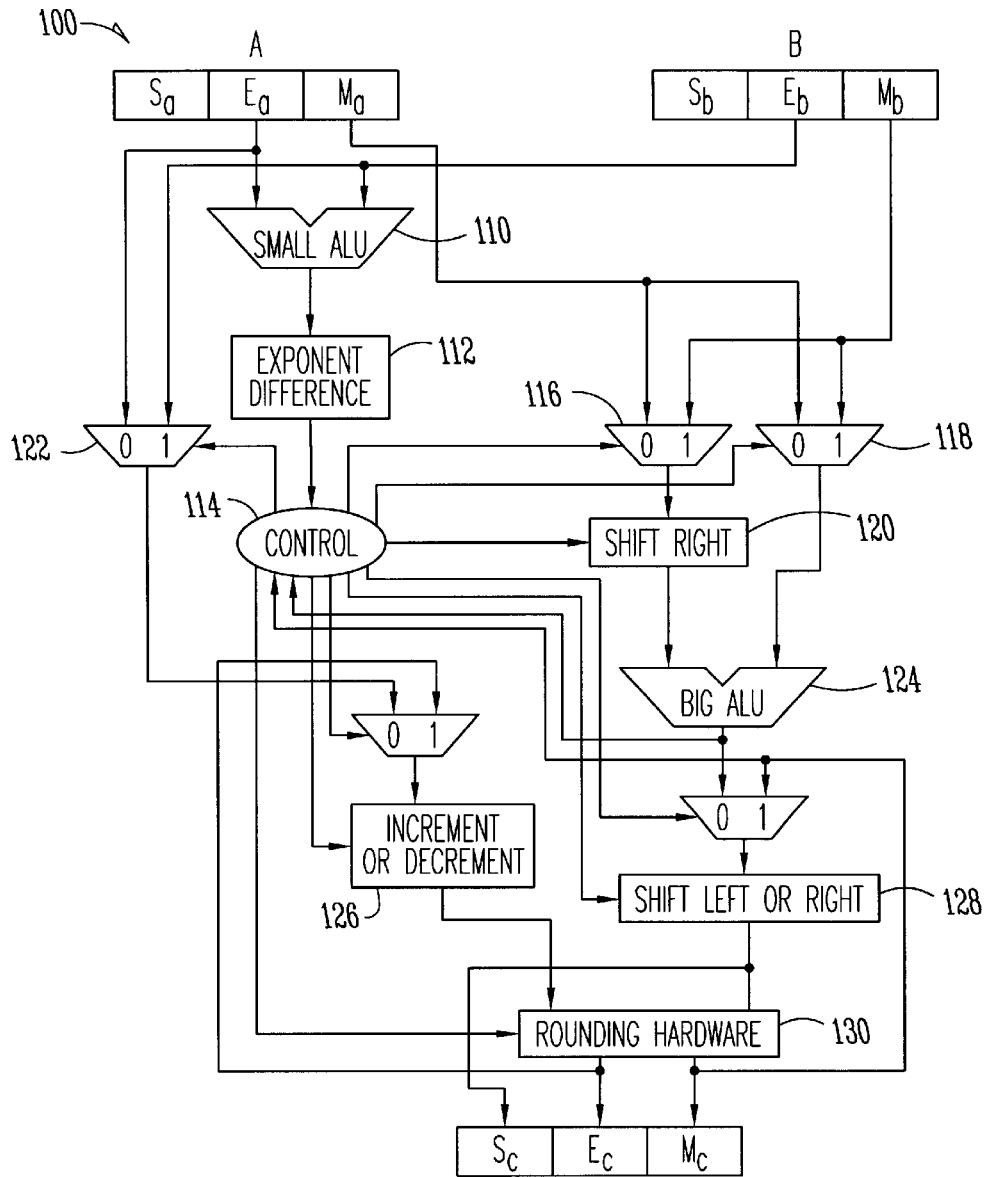
FIG. 1 shows a prior art floating point adder circuit.
Figure 2:
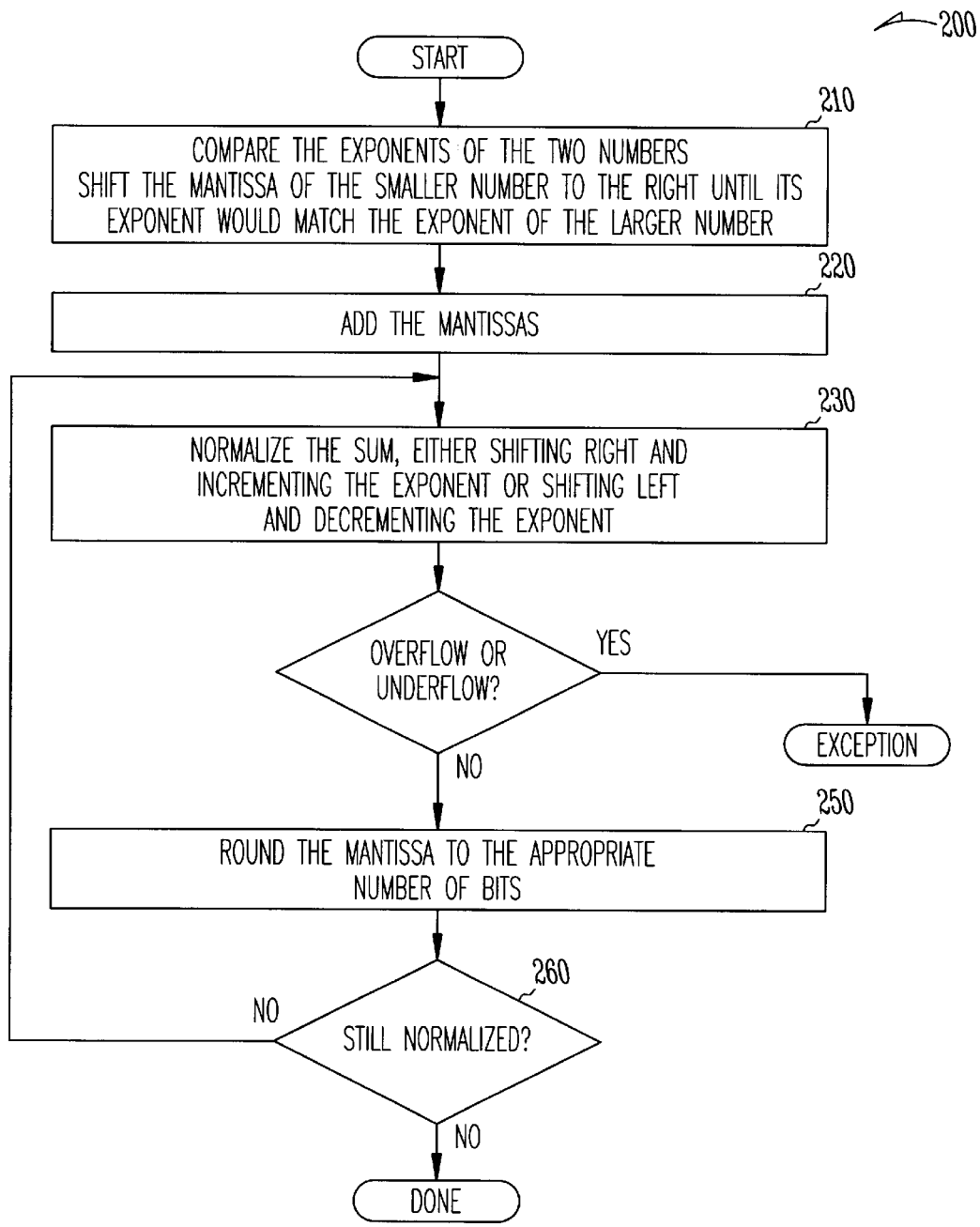
FIG. 2 shows a prior art method for a floating point adder circuit.

In the following detailed description of the embodiments, reference is made to the accompanying drawings which show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention perform a floating point addition by converting an IEEE standard single precision floating point number to a base 32 number. The use of converted numbers obviates the need for an eight bit subtractor in the exponent path and also obviates the need for a variable shifter in the mantissa path. The exponent path includes a comparator to compare three bit exponent values, and the mantissa path includes a constant shifter.

Figure 3:
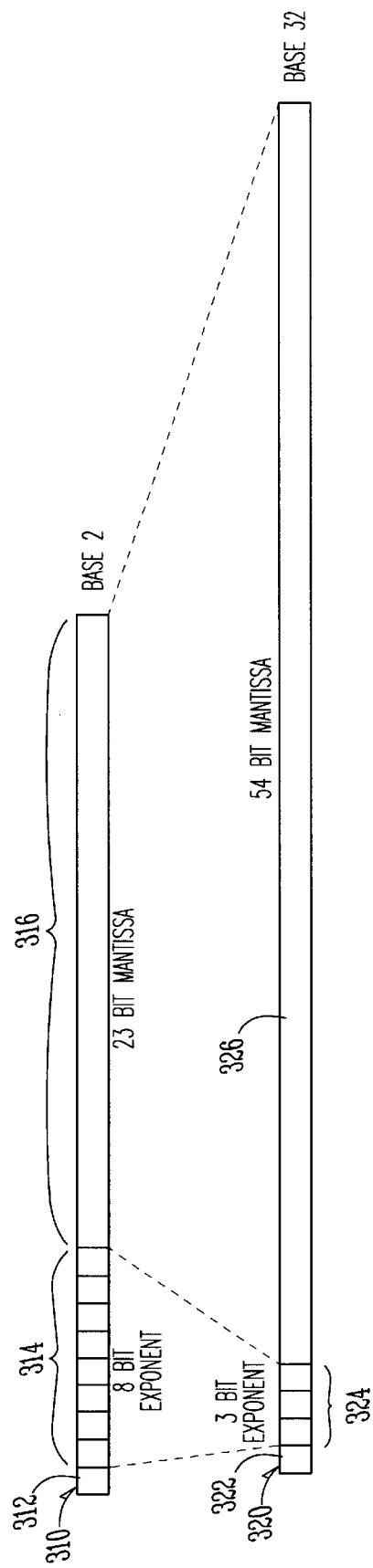
FIG. 3 shows a base 32 floating point number representation.

FIG. 3 shows base 2 and base 32 floating point number representations. Base 2 floating point number representation 310 includes sign bit 312, eight bit exponent field 314, and twenty-three bit mantissa field 316. Base 2 floating point number representation is in the IEEE standard single precision format. Base 32 floating point number 320 includes a sign bit 322, a three bit exponent field 324, and a fifty-four bit mantissa field 326. Some embodiments of the present invention convert floating point numbers in representation 310 to and from floating point numbers in representation 320. This is performed by evaluating the least significant five bits of exponent 314 to obtain a mantissa shift value, and shifting mantissa 316 to the right by the number of bit positions equal to the mantissa shift value. Because five bits of exponent are evaluated, the mantissa shift value can be a number between zero and thirty-one. Mantissa field 326 holds the shifted mantissa without loss of precision, because the maximum size of the twenty three bit mantissa shifted by thirty-one yields a fifty-four bit mantissa.

The least significant five bits of the exponent 314 are then truncated, and exponent 324 is equal to the most significant three bits of exponent 314. The least significant bit of exponent 324 has a "weight" of thirty-two. In other words, a least significant change in exponent 324 corresponds to a mantissa shift of thirty-two bits. For this reason, floating point representation 320 is dubbed a "base 32" floating point representation.

The remainder of this description provides details of embodiments that add floating point numbers in base 32 format. Other embodiments of the present invention add floating point numbers in formats other than base 32. For example, in some embodiments, floating point numbers in a "base 16" format that have an exponent field with a least significant bit weight of sixteen are summed. In other embodiments, floating point numbers with exponent fields having least significant bit weights of other than thirty two or sixteen are summed. In general, embodiments of the present invention exist for floating point representions having least significant bit weights of other than one.

Extended precision embodiments also exist. For example, in the embodiment of FIG. 3, an IEEE standard single precision floating point number with an eight bit exponent field is converted to a base 32 format floating point number with a three bit exponent field. In other embodiments, extended precision floating point numbers can be converted into base 32 format. In some of these embodiments, the exponent field of the base 32 format number is larger than three, and the mantissa field is larger than fifty-four.

Figure 4:
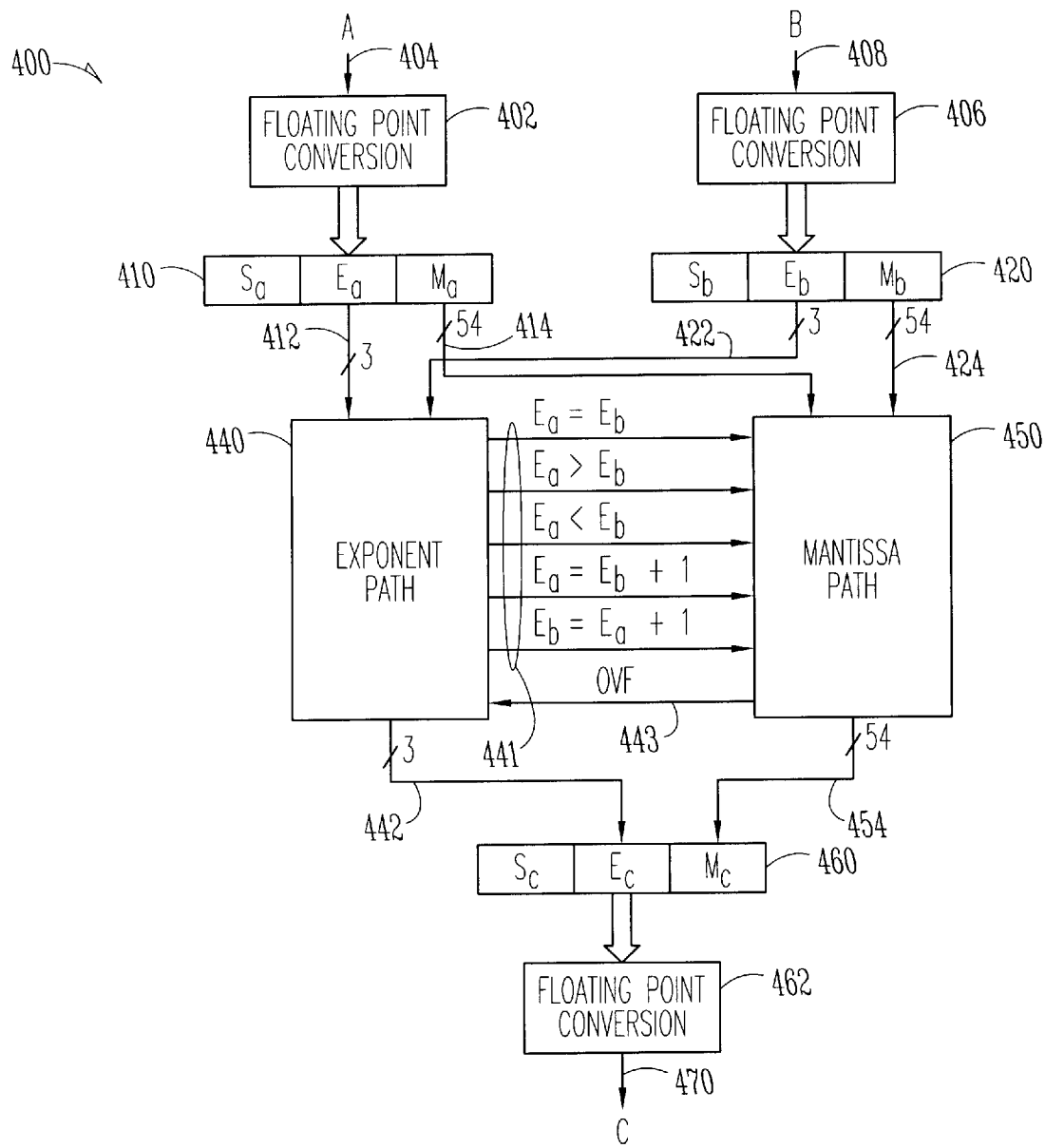
FIG. 4 shows an integrated circuit with a floating point adder.

FIG. 4 shows an integrated circuit with a floating point adder. Integrated circuit 400 includes floating point conversion blocks 402, 406, and 462, exponent path 440, and mantissa path 450. Exponent path 440 and mantissa path 450 are floating point adder paths, and together form a floating point adder circuit. Exponent path 440 and mantissa path 450 are shown in more detail in FIGS. 5 and 6. Also shown in FIG. 4 are floating point numbers 410, 420, and 460. For clarity, floating point numbers 410, 420, and 460 are shown separately from the floating point conversion blocks and adder paths. In some embodiments, registers exist where floating point numbers 410, 420, and 460 are shown, and in other embodiments, the floating point numbers are not held in registers, but instead are received by the adder paths directly from other circuits.

In some embodiments, floating point conversion blocks 402 and 406 convert floating point numbers from IEEE standard single precision floating point format to a base 32 format. For example, in some embodiments, floating point conversion block 402 converts floating point number "A" from IEEE standard single precision format on node 404 to a base 32 floating point representation at 410. Also for example, in some embodiments, floating point conversion block 406 converts floating point number "B" from IEEE standard single precision floating point format on node 408 to a base 32 floating point representation at 420. Referring now back to FIG. 3, in some embodiments, numbers on nodes 404 and 408 are represented using floating point representation 310, and numbers at 410 and 420 are represented using floating point representation 320.

In some embodiments, floating point conversion blocks 402 and 406 convert numbers from other floating point representations to base 32 format. For example, in some embodiments, floating point converters 402 and 406 convert integers into floating point numbers. In other embodiments, floating point conversion blocks 402 and 406 convert floating point numbers in formats other than IEEE standard formats into base 32 format. In still other embodiments, floating point conversion blocks 402 and 406 are omitted. In some of these embodiments, floating point numbers throughout integrated circuit 400 are represented in base 32 format.

Floating point conversion block 462 converts floating point number "C" from base 32 representation at 460 into a format other than base 32 format on node 470. In some embodiments, floating point conversion block 462 converts the floating point number at 460 to an IEEE standard single precision number on node 470. In other embodiments, floating point conversion block 460 converts the number to a format other than an IEEE standard format. In general, floating point conversion block 462 operates in reverse of floating point conversion blocks 402 and 406. As previously described, in some embodiments, floating point conversion block 462 is omitted.

Floating point number 410 includes a single sign bit ($S_a$), a three bit exponent field ($E_a$), and a 54 bit mantissa field ($M_a$). Likewise, floating point number 420 includes a single sign bit ($S_b$), a three bit exponent field ($E_b$), and a fifty-four bit mantissa field ($M_b$). Exponent path 440 receives exponents $E_a$ and $E_b$ on nodes 412 and 422, respectively, and produces resultant exponent $E_c$ on node 442. Exponent path 440 also produces five digital signals 441. Digital signals 441 carry information from exponent path 440 to mantissa path 450 to signify whether the two exponents are equal ($E_a=E_b$), whether one exponent is greater than the other ($E_a>E_b$, $E_a<E_b$), and whether one exponent is one greater than the other ($E_a=E_b+1$, $E_b=E_a+1$). Because floating point numbers 410 and 420 are in base 32 format, an exponent that differs by a least significant bit differs by a "weight" of thirty-two. Therefore, while exponent path 440 detects a physical difference of one, a logical difference of thirty-two is detected. Exponent path 440 also receives an overflow signal (OVF) from mantissa path 450 on node 443.

Mantissa path 450 receives mantissa fields $M_a$ and $M_b$ on nodes 414 and 424, respectively, and produces resultant mantissa field $M_c$ on node 454. Mantissa path 450 also receives digital signals 441 from exponent path 440, and produces the overflow signal (OVF) and sends it to exponent path 440. The OVF signal is asserted when a mantissa overflow condition has occurred. The floating point adder paths and the signals therebetween are described in more detail below.

Figure 5:
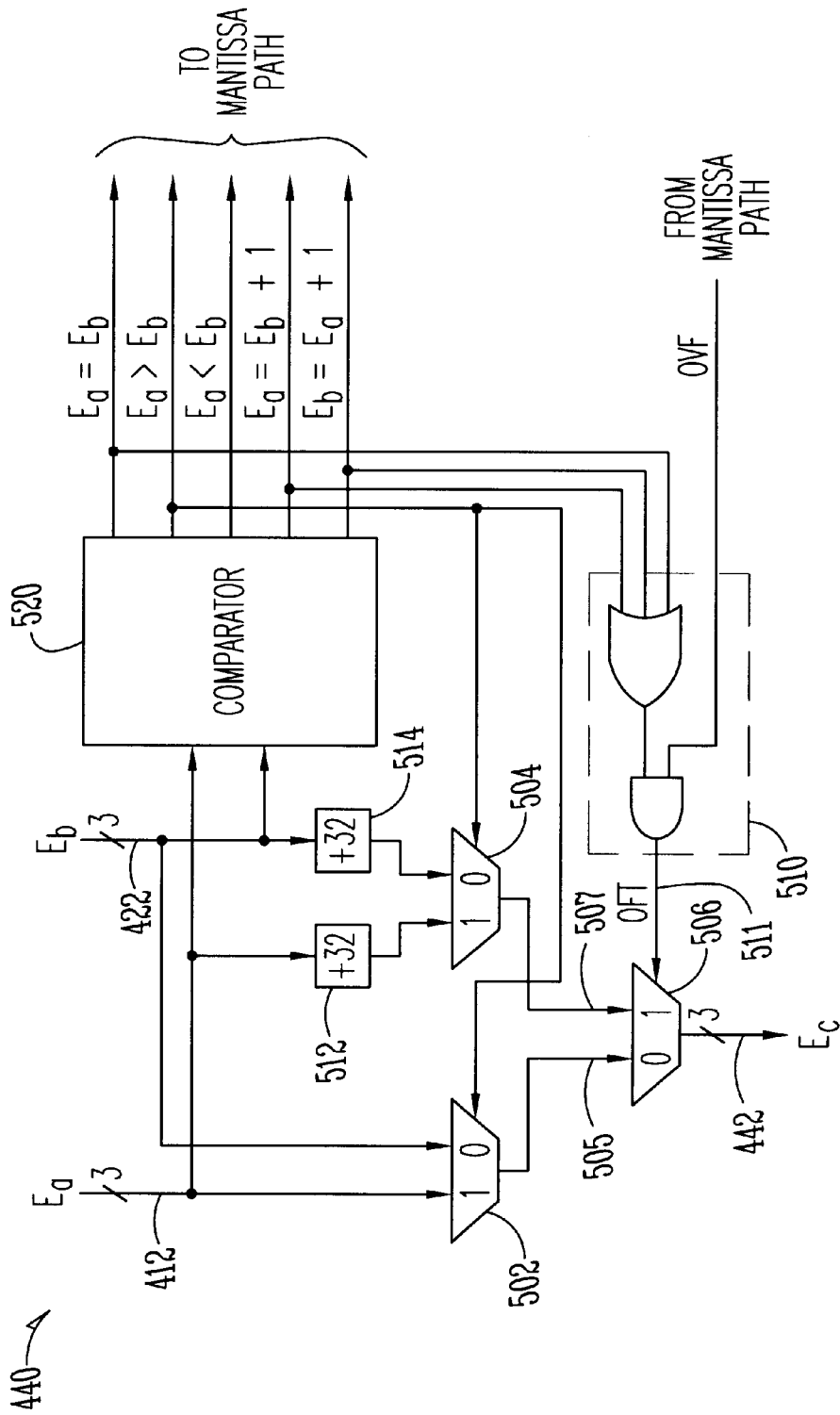
FIG. 5 shows an exponent path of a floating point adder.

FIG. 5 shows an exponent path of a floating point adder. Exponent path 440 includes multiplexors 502, 504, and 506, comparator 520, incrementers 512 and 514, and logic 510. Incrementers 512 and 514 pre-increment $E_a$ and $E_b$ to produce an incremented $E_a$ and an incremented $E_b$, respectively. When either exponent $E_a$ or $E_b$ is incremented, the weight of the exponent is changed by thirty-two with respect to the mantissa. Accordingly, incrementers 512 and 514 are shown in FIG. 5 with the label "+32."

In operation, comparator 520 compares exponents $E_a$ and $E_b$, and generates logic outputs as shown in FIG. 5. When $E_a$ is greater than $E_b$, the ($E_a>E_b$) signal controls multiplexors 502 and 504 to select $E_a$ and the incremented $E_a$, respectively. Otherwise, multiplexors 502 and 504 select $E_b$ and the incremented $E_b$, respectively. Multiplexor 506 selects either the exponent on node 505 or the incremented exponent on node 507 based on the overflow trigger (OFT) signal on node 511. OFT is asserted only if the OVF signal is asserted and the two three-bit input exponents are either equal or differ by one. Logic 510 receives OVF from the mantissa path and logic outputs from comparator 520, and produces the OFT signal according to the following equation:

$$OFT=OVF \text{ AND } ((E_a=E_b) \text{ OR } (E_a=E_b+1) \text{ OR } (E_b=E_a+1)).$$

When OFT is true, the resultant exponent $E_c$ is chosen as the incremented exponent on node 507, and when OFT is false, the resultant exponent is chosen as the greater exponent on node 505.

Comparator 520 compares three bit exponents and produces a plurality of outputs that are logic functions of the inputs. Each logic output is a function six input bits: three bits from $E_a$, and three bits from $E_b$. This provides a very quick logic path as compared to the prior art discussed with reference to FIG. 1, above. In addition to the quick comparison made in the exponent path, the mantissa path includes constant shifters that conditionally shift mantissas by a fixed amount. The combination of a quick exponent comparison in the exponent path and a quick shift in the mantissa path provide for a fast floating point adder circuit. The constant shifter is described in more detail below with reference to FIG. 6.

Figure 6:
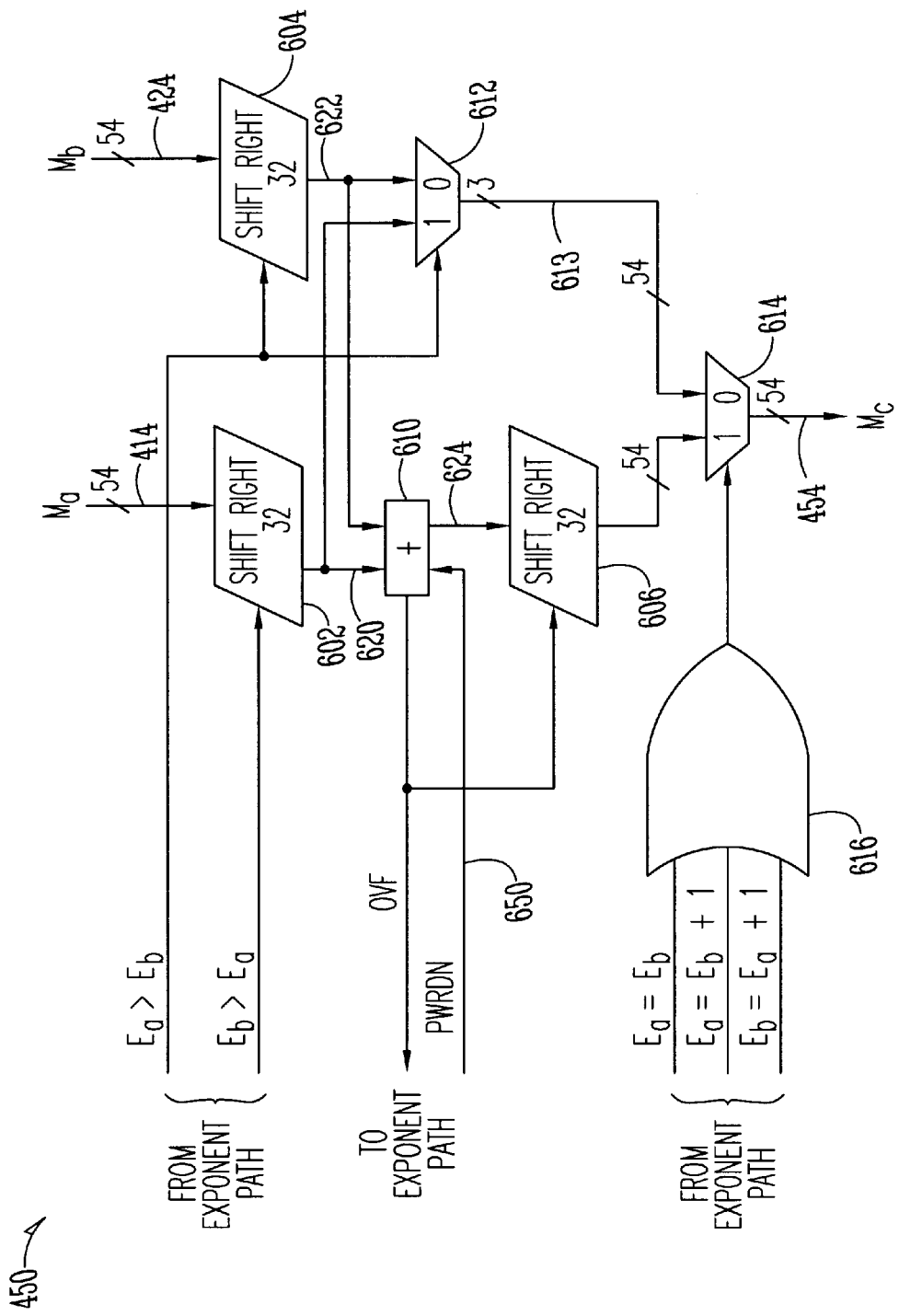
FIG. 6 shows a mantissa path of a floating point adder.

FIG. 6 shows a mantissa path of a floating point adder. Mantissa path 450 includes constant shifters 602, 604, and 606, adder circuit 610, multiplexors 612 and 614, and logic 616. The expensive variable shifters used in prior art adder circuits such as that of FIG. 1 are replaced in the present invention with constant shifters 602, 604, and 606. This simplification saves on the amount of hardware necessary to implement the adder, and also decreases execution time. In some embodiments, constant shifters 602, 604, and 606 are implemented as a series of two-input multiplexors.

Constant shifters 602 and 604 conditionally shift mantissas by an amount equal to the weight of the least significant bit of the exponent fields in the exponent path. For example, in base 32 embodiments as shown in the figures, the least significant bits of the exponents have a weight of thirty-two, and constant shifters 602 and 604 each conditionally shift a mantissa thirty-two bit positions to the right. Likewise, in base 16 embodiments, the least significant bits of the exponents have a weight of sixteen, and constant shifters 602 and 604 each conditionally shift a mantissa sixteen bit positions to the right. In general, constant shifters 602 and 604 can have any constant shift amount.

Mantissa path 450 receives mantissa $M_a$ on node 414 and mantissa $M_b$ on node 424. In embodiments represented by FIG. 6, constant shifter 604 shifts $M_b$ thirty-two bit positions to the right when $E_a$ is greater than $E_b$, and constant shifter 602 shifts $M_a$ thirty-two bit positions to the right when $E_b$ is greater than $E_a$. When $E_a$ is equal to $E_b$, then neither mantissa is shifted in mantissa path 450. After constant shifters 602 and 604, mantissa path 450 separates into two sub-paths: the integer adder path and the bypass path. The integer adder path includes adder 610 and constant shifter 606, while the bypass path includes multiplexor 612.

Adder circuit 610 adds the two mantissas on nodes 620 and 622, and produces the result on node 624. If an overflow occurs in adder circuit 610, the OVF signal is asserted and constant shifter 606 shifts the mantissa produced by adder circuit 610 thirty-two bit positions to the right. The OVF signal is sent to exponent path 440 to conditionally select an incremented exponent, as described above with reference to FIG. 5. In some embodiments, adder circuit 610 is a conventional binary adder suitable to add two binary words. In other embodiments, adder circuit 610 is implemented using full adders arranged as three-to-two (3:2) compressors and four-to-two (4:2) compressors. For a discussion of compressors, see Neil H. E. Weste & Kamran Eshragihan, "Principles of CMOS VLSI Design: A Systems Perspective," 2$^{nd}$ Ed., pp. 554–558 (Addison Wesley Publishing 1993).

In some embodiments, adder circuit 610 can be powered down when not in use. For example, when the resultant exponent on node 454 is chosen from the bypass path rather than the integer adder path, adder circuit 610 can be shut down to save power. In the embodiment of FIG. 6, adder circuit 610 can be powered down by asserting the PWRDN signal on node 650.

Multiplexor 612, like adder circuit 610, receives exponents on nodes 620 and 622. Unlike adder circuit 610, however, multiplexor 612 selects one of the inputs rather than adding them. Multiplexor 612 selects the mantissa that corresponds to the larger floating point number. For example, when $E_a$ is greater than $E_b$, multiplexor 612 selects $M_a$. Also for example, when $E_b$ is greater than $E_a$, multiplexor 612 selects $M_b$. Multiplexor 612 drives node 613 with the selected mantissa.

Multiplexor 614 selects the resultant mantissa $M_c$ from the integer adder path when the input exponents are equal or differ by one, and selects the resultant mantissa $M_c$ from the bypass path when the input exponents differ by more than one. When the input exponents differ by more than one, a shift of sixty-four or more would be needed to align the mantissas for addition, and the mantissas in the embodiment of FIG. 6 are only fifty-four bits long.

The outputs from mantissa path 450 (FIG. 6) and exponent path 440 (FIG. 5) are normalized and converted to a standard floating point representation. For example, in embodiments that utilize IEEE standard single precision floating point number representations, the outputs from mantissa path 450 and exponent path 440 are normalized and converted to a IEEE standard single precision floating point number.

The method an apparatus of the present invention provide for a fast and efficient floating point addition operation. Floating point numbers are represented in formats with relatively small exponent fields to allow for quick comparisons in the exponent path. Mantissa fields are expanded so precision can be maintained with smaller exponents. Furthermore, the method and apparatus of the present invention can provide precision comparable to the precision available using prior art double precision arithmetic units, in part because the mantissa fields are expanded. In some embodiments the floating point representation used is a base 32 format with a three bit exponent and a fifty-four bit mantissa. In these embodiments, the three bit exponent fields can be quickly compared, and a shift of thirty-two bits in the mantissa path can be carried out by a constant shifter.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A floating point adder circuit comprising:
    an exponent path to compare exponents of floating-point numbers having least significant bits with a weight of other than one, wherein the exponent path includes a comparator comprising:
        a first input node to accept a first three-bit exponent having a least significant bit with a weight of thirty-two,
        a second input node to accept a second three-bit exponent having a least significant bit with a weight of thirty-two, and
        a plurality of output nodes to signify whether the first exponent is larger, smaller, or equal to the second exponent;
    a mantissa path having a shifter to shift a mantissa of one of the floating-point numbers responsive to the exponent path, wherein the mantissa path comprises a constant shifter to conditionally shift a mantissa by thirty-two bits.

2. The floating point adder circuit of claim 1 wherein the constant shifter comprises a multiplexor.

3. A floating point adder circuit comprising:
    an exponent path to compare exponents having least significant bits with a weight of other than one; wherein the exponent path includes a comparator to compare three bit exponents of two floating point numbers; and
    a mantissa path having a shifter to shift a mantissa of one of the floating point numbers, responsive to the exponent path, wherein the mantissa path includes a constant shifter to conditionally shift a mantissa of one of the two floating point numbers by thirty-two bits.

4. The floating point adder circuit of claim 3 wherein the mantissa path further includes:
    an adder to add the mantissas of the two floating point numbers; and
    a multiplexor in parallel with the adder to conditionally select one of the mantissas to be a resultant mantissa.

5. The floating point adder of claim 4 wherein the adder includes an input to power it down when not in use.

6. The floating point adder circuit of claim 3 wherein the two floating point numbers include fifty-four bit mantissas.

7. A method of floating point addition comprising:
    comparing an exponent of a first floating point number to an exponent of a second floating point number;
    if the exponent of the first floating point number is one greater than the exponent of the second floating point number, shifting a mantissa of the second floating point number thirty-two bit positions to the right;
    selecting the first exponent as a resultant exponent; and
    producing a resultant mantissa from a mantissa of the first floating point number and the shifted mantissa of the second floating point number.

8. A method, comprising:
    receiving two input floating-point numbers having input mantissas and having input exponents having a first base whose least significant bits have a first weight;
    converting the input exponents and the input mantissas to a second base whose least significant bit has a second weight greater than the first weight;
    comparing the converted exponents without adding or subtracting them;
    conditionally shifting the converted mantissas by a fixed amount in response to the comparing operation to produce intermediate mantissas.

9. The method of claim 8 further comprising manipulating the converted exponents without subtracting them from or adding them to each other, in response to the comparing operation, to produce an output exponent.

10. The method of claim 9 where manipulating the converted exponents includes selecting the greater one of the converted exponents, if one of them is greater than the other.

11. The method of claim 9 further comprising selectively modifying at least one of the converted exponents in response to the comparing operation, to produce the output exponent.

12. The method of claim 9 further comprising reconverting the output exponent to the first base.

13. The method of claim 8 further comprising combining the intermediate mantissas to produce an output mantissas.

14. The method of claim 13 where the intermediate mantissas are combined only if the comparing operation determines that the converted exponents lie at or within a predetermined range of each other.

15. The method of claim 14 where the predetermined range is one.

16. The method of claim 14 where the output mantissa corresponds to one of the converted mantissas if the converted exponents lie outside the range.

17. The method of claim 13 further comprising producing an overflow flag responsive to a magnitude of the output mantissa.

18. The method of claim 17 further comprising:
    modifying at least one of the converted exponents by a fixed amount;
    selecting one of the modified converted exponent(s) in response to the comparing operation and the overflow flag.

19. The method of claim 17 further comprising selecting one of the converted exponents in response to the comparing operation and an absence of the overflow flag.

20. The method of claim 8 where the conditionally shifting operation comprises shifting one of the one converted mantissas if one of the input exponents exceeds the other of the input exponents.

21. The method of claim 20 where the fixed amount is determined at least partly by the second base.

22. The method of claim 8 where the first weight is one.

23. The method of claim 22 where the second weight is 32.

24. The method of claim 8 where the converted exponents have a length of three bits.

25. The method of claim 24 where the input exponents have a length of eight bits.

26. The method of claim 8 where the length of the converted mantissas is equal to or greater than the length of the input mantissas plus the difference between the second weight and the first weight.

27. The method of claim 26 where the length of the input mantissas is 23 bits and the length of the converted mantissas is 54 bits.

28. An apparatus comprising input nodes to receive two input FP numbers, having input mantissas and having input exponents having a first base whose least significant bits have a first weight;

an input converter to modify the input exponents to a second base whose least significant bit has a second weight greater than the first weight;

a comparator to compare the converted exponents;

a shifter responsive to the comparator to conditionally shift the converted mantissas by a fixed amount determined by the second weight, to produce intermediate mantissas.

29. The apparatus of claim 28 further comprising an adder to receive the conditionally shifted intermediate mantissas from the shifter and to combine them to produce an output mantissa.

30. The apparatus of claim 29 where the adder adds the intermediate mantissas.

31. The apparatus of claim 29 further comprising a bypass path to bypass the adder in response to a particular condition from the comparator.

32. The apparatus of claim 29 further comprising an output converter to reconvert the second base to the first base.

33. The apparatus of claim 28 where the comparator produces an output indicating whether the converted exponents are equal.

34. The apparatus of claim 33 where the shifter does not shift either of the converted mantissas if the converted exponents are equal.

35. The apparatus of claim 28 where the comparator produces an output including
a first line indicating that a first of the converted exponents exceeds the second,
a second line indicating that the second of the converted exponents exceeds the first.

36. The apparatus of claim 35 where the conditional shifter includes a first shift unit responsive to only the first line to shift only the second converted mantissa by the fixed amount.

37. The apparatus of claim 35 where the conditional shifter includes a second shift unit responsive only to the second line to shift the only the first converted mantissa by the fixed amount.

38. The apparatus of claim 28 where the comparator produces an output indicating whether the converted exponents lie within a predetermined range of each other.

39. The apparatus of claim 38 further comprising a first multiplexer
to produce an output mantissa from a combination of the intermediate mantissas if the comparator output indicates that the converted exponents lie within the predetermined range,
to produce the out put mantissa directly from one of the intermediate mantissas if.

40. The apparatus of claim 39 further comprising a second multiplexer to select the greater of the intermediate mantissas if the comparator output indicates that the converted exponents lie outside the predetermined range.

* * * * *

UNITED STATES PATENT AND TRADEMARK OFFICE
CERTIFICATE OF CORRECTION

PATENT NO. : 6,889,241 B2 Page 1 of 1
DATED : May 3, 2005
INVENTOR(S) : Pangal et al.

It is certified that error appears in the above-identified patent and that said Letters Patent is hereby corrected as shown below:

<u>Title page,</u>
Item [56], References Cited, OTHER PUBLICATIONS, "Lou, Z., et al." reference, delete "Integar" and insert -- Integer --, therefor.

<u>Column 8,</u>
Line 31, delete "mantissas" and insert -- mantissa --, therefor.

<u>Column 10,</u>
Line 26, delete "out put" and insert -- output --, therefor.

Signed and Sealed this

Fifteenth Day of November, 2005

JON W. DUDAS
*Director of the United States Patent and Trademark Office*